United States Patent [19]

Kurachi et al.

[11] Patent Number: 4,742,029

[45] Date of Patent: May 3, 1988

[54] PROCESS FOR PRODUCING A SINTERED CUBIC SILICON CARBIDE

[75] Inventors: Yasuo Kurachi, Kodaira; Katsuhiko Arai, Iruma; Koichi Irako, Higashimurayama, all of Japan

[73] Assignee: Bridgestone Corporation, Tokyo, Japan

[21] Appl. No.: 746,033

[22] Filed: Jun. 18, 1985

[30] Foreign Application Priority Data

Jun. 20, 1984 [JP] Japan ................... 59-126640
Nov. 29, 1984 [JP] Japan ................... 59-252497

[51] Int. Cl.$^4$ ............... C04B 35/56; C01B 31/36
[52] U.S. Cl. .................... 501/88; 423/345; 501/89; 501/90
[58] Field of Search ............. 423/345; 501/89, 88, 501/90

[56] References Cited

U.S. PATENT DOCUMENTS 4,395,460 7/1983 Gaul ........................ 501/90

FOREIGN PATENT DOCUMENTS 0052487 5/1982 European Pat. Off. ......... 423/345
56-155071 12/1981 Japan ........................ 501/90

Primary Examiner—Mark L. Bell
Attorney, Agent, or Firm—Birch, Stewart, Kolasch & Birch

[57] ABSTRACT

A process for producing a normal sintered cubic silicon carbide which comprises sintering cubic silicon carbide powder made up of crystallites of more than 480 Å in size determined from the reflection in the (4 2 0) plane measured by the powder X-ray diffraction method.

22 Claims, 2 Drawing Sheets

SIZE OF CRYSTALLITE DETERMINED FROM
THE REFLECTION IN THE (420) PLANE (Å)

PROCESS FOR PRODUCING A SINTERED CUBIC SILICON CARBIDE

FIELD OF THE INVENTION

The present invention relates to a process for producing a sintered cubic silicon carbide (hereafter abbreviated as β-SiC) which has a dense structure. More specifically, the invention relates to a process for producing a sintered β-SiC by sintering β-SiC powder of particular properties or the combination of the β-SiC powder and specific amounts of additives.

DESCRIPTION OF THE PRIOR ART

Sintered silicon carbide (hereafter described as SiC) is high both in hardness and strength at high temperature, excellent in heat resistance, and chemically stable. Accordingly, it is widely used for wear-resisting machine parts, structural materials, heat-resisting materials, etc. SiC powder generally includes the two crystal forms α and β. In the conventional process for obtaining sintered β-SiC, boron and carbon are mixed with the β-SiC powder, and the resultant mixture is sintered in an atmosphere of CO gas or inert gas.

In such a production of a sintered β-SiC, exaggerated grain growth occurs at the last stage of the normal pressure sintering process, and large particles of more than 100 μm in size are abundantly formed. Therefore, it is difficult to obtain the high-strength SiC. In the sintering process, boron acts effectively on the denseness of the specimen. At the same time, however, the boron promotes the growth of particles in the last stage of sintering. Carbon removes $SiO_2$ which is an impurity contained in the β-SiC powder and must be removed because it inhibits the sintering. However, carbon is regarded as being harmful if it is added in amounts more than required for deoxidation.

Accordingly, in sintering the β-SiC powder, the boron and carbon mixed with it have been used in amounts in particular ranges. For example, the amounts of boron and carbon used range from 0.5 to 5.0% by weight and from 1.5 to 5.0% by weight, respectively (Japanese Patent Laid-open No. 58-17146), or range from 0.3 to 3.0% by weight and from 0.1 to 1.0% by weight, respectively (Japanese Patent Laid-open No. 57-32035). Thus, the β-SiC powder is sintered using boron in amounts of more than 0.3% by weight and no more added carbon than is needed.

In the conventional process, however, the amounts of additives used are large, and the exaggerated grain growth occurs depending on the raw material powder used, whereby the normal pressure-sintered β-SiC cannot be obtained easily. Consequently, the sintered product having a satisfactory density cannot be obtained.

Japanese Patent Laid-open No. 55-46996 discloses a process in which carbon and boron in amounts ranging from 0.1 to 5.0% by weight are respectively mixed with the β-SiC powder produced by a particular method and the resultant mixture burned. Although it describes that the amount of boron used may be lowered to 0.1% by weight, the amount of boron used in all embodiments of the disclosure is more than 1.0% by weight, and it is not verified that an excellent sinter can be obtained by the addition of boron in small amounts of less than 1.0% by weight. As mentioned above, in the known process, the relationship between the β-SiC powder and additives is not clarified, and hence the known process for producing a normal sintered β-SiC is not necessarily satisfactory. Therefore, there has been a need for an advantageous process of industrially producing a normal sintered β-SiC having a high density.

SUMMARY OF THE INVENTION

An object of the present invention is to provide a process for producing a normal sintered cubic silicon carbide (normal sintered β-SiC) having a highly dense structure.

More specifically, as a result of intensive studies on the reaction mechanism and sintering conditions in sintering β-SiC powder in order to obtain a sintered β-SiC having a high dense structure, the present inventors have seized on the relationship between the amounts of additives and properties of the β-SiC powder, which had not been determined the in the known process, and have clarified requirements for producing a sintered β-SiC having a high density without difficulty and have obtained the following information.

(1) The grain boundary energy of β-SiC particles decreases if carbon substances and/or other substances are interposed among the β-SiC particles. Accordingly, the presence of the interposed substances can promote the sintering and depress the grain growth.

(2) Energy inducing the grain growth is governed by the total free energy of surface energy, grain boundary energy, etc., accompanied by the grain system. The exaggerated grain growth occurs readily if the surplus free energy in the system increases.

(3) The crystallinity of the β-SiC particles becomes increasingly poor and crystallites decrease in size if the amount of impurities contained in the β-SiC powder increases.

Accordingly, the necessity of additives is demonstrated from (1) above. Also, it follows from (2) and (3) above that because there appears to be differences in the degree of denseness among sinters produced according to the properties of the raw material powder used such production of the sintered β-SiC has not been undertaken. Therefore, although many patents on the sintering of β-SiC have been submitted and various amounts of added boron disclosed, there are few embodiments in which excellent sinters were obtained by the addition of boron in amounts up to 0.3% by weight, and there is no embodiment in which an excellent sinter was obtained by the addition of boron in amounts up to 0.2% by weight. Since the crystallites of β-SiC powder used in the conventional process are small and the crystallinity imperfect, it appears impossible to produce an excellent sintered silicon carbide having a high density.

The inventors have succeeded in increasing the size of crystallites of the β-SiC powder, and have found that a highly dense sintered cubic silicon carbide can be produced in the presence of small amounts of additives by using β-SiC powder made up of large crystallites. The present invention has been completed based on the above findings.

Therefore, the present invention provides a process for producing a sintered cubic silicon carbide which comprises sintering cubic silicon carbide powder made up of crystallites of more than 480 Å in size determined from the reflection in the (4 2 0) plane measured by the powder X-ray diffraction method.

According to the present invention, by the use of such a particular β-SiC powder, a highly dense sintered β-SiC can be produced even with small additions of sintering additives, i.e. in amounts of from 0.5% to 3% by weight of carbon and from 0.05% to less than 0.3% by weight of boron, or in amounts of from 0.5% to 3% by weight of carbon, from 0.05% to 0.2% by weight of boron and from 0.05% by weight to 1% by weight of an aluminum-containing compound.

The above and other objects, features and advantages of the present invention will be more fully understood from the following description in conjunction with the drawings.

DETAILED DESCRIPTION OF THE INVENTION

The β-SiC powder used as a raw material in the invention is made up of crystallites of more than 480 Å, preferably more than 600 Å, the size being determined from the reflection in the (4 2 0) plane measured by the powder X-ray diffraction method.

The method for measuring the size of crystallites of the β-SiC powder used in the invention will be described hereinafter.

In general, the powder is made up of numerous primary particles which, in turn, are made up of smaller crystallites. The more perfect the primary particles are, the smaller is the free energy in the system and the easier is the sintering. The direct measurement of the size of the primary particles is carried out using an electron microscope. The distribution of sizes of the primary particles can be seen using a measuring instrument such as particle size analyzer. Also, the size of the crystallites can be estimated by the powder X-ray diffraction method.

As is generally known, the width of absorption obtained by the measurement using the powder X-ray diffraction method increases with decreasing thickness of crystals. In view of this, the size of the crystallites can be determined from the diffraction pattern. The following equation (A) known as the Scherrer equation is used for determining the size "t" of the crystallites.

$$t = \frac{0.9\lambda}{B \cos\theta_B} \quad (A)$$

In the equation (A), "B" is the width at the half height of the maximum intensity of the diffraction pattern, and is expressed in radians. "λ" is the wavelength of X-rays. "$\Theta_B$" is ½ of the reflection angle (2Θ) value of the diffraction pattern.

It is noted that the X-rays used may not be monochromatic. For example, in the case where Cu-Kα rays are used as X-rays, two kinds of reflections, Kα₁ and Kα₂, are observed. Accordingly, caution should be given to the determination of "B" in the above equation (A). More specifically, at the diffraction peak on the small angle side, there is a small difference in reflection peak between Kα₁ and Kα₂, and usually only one absorption may be observed. In the measurement on the large angle side, however, the reflection peaks of Kα₁ and Kα₂ are observed separated from each other. Nevertheless, in the case of β-SiC powder made up of small crystallites, the reflection peaks of Kα₁ and Kα₂ are not separated from each other at times even on the large angle side. Therefore, it is preferable to determine "B" after the separation of Kα₁ and Kα₂.

Figure 1:
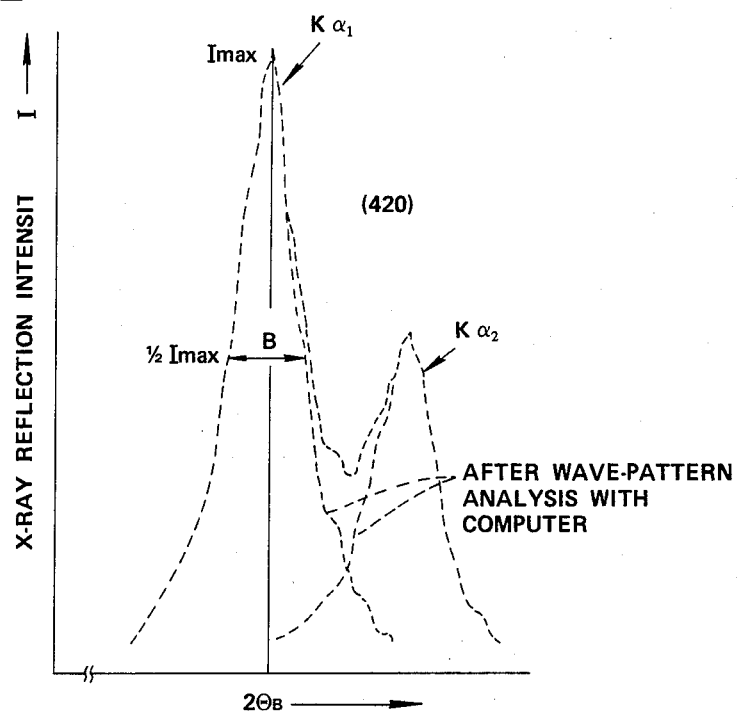
FIG. 1 shows the results of the powder X-ray diffraction and wave-pattern analysis of β-SiC powder made up of crystallites of 640 Å in size used in the invention.
Figure 2A:
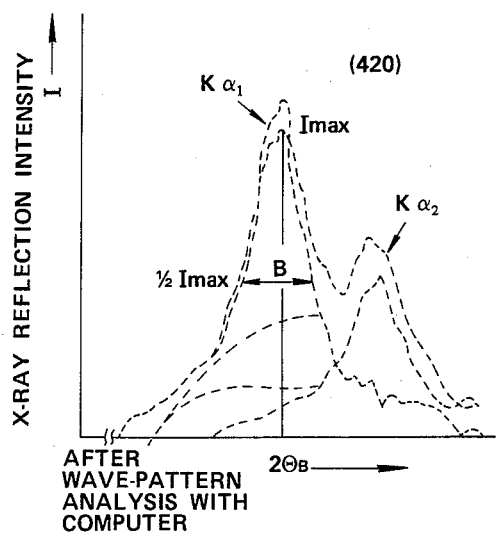
FIGS. 2(a) and 2(b) show the results of the powder X-ray diffraction and wave-pattern analysis of β-SiC powder on the market.
Figure 2B:
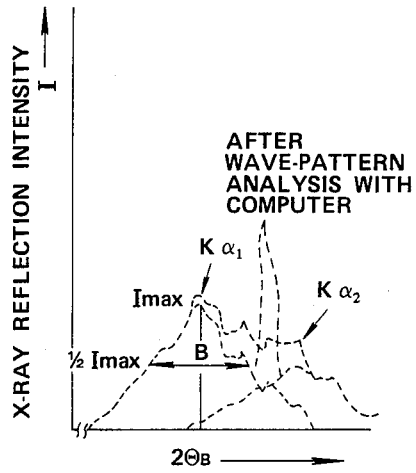

Thus, the inventors have adopted the following method. The reflection in the (4 2 0) plane, i.e. reflection on the large angle side, of the β-SiC powder is subjected to a wave-pattern analysis using a computer, Kα₁ and Kα₂ are separated from each other, and "B" is determined. In the determination of "$\Theta_B$", Si (silicon) was used as an internal standard. An example of the determination is shown in FIG. 1 which shows a sample of β-SiC powder made up of crystallites of 640 Å in size. As shown in FIG. 1, "B" is determined after the separation of Kα₁ and Kα₂. FIGS. 2(a) and (b) show the example of the reflection in the (4 2 0) plane of β-SiC powder having crystallites of less than 480 Å in size on the market. The measurements in FIGS. 1 and 2 are carried out under the following conditions: scanning rate: ¼°/min, time constant: 4; chart feeding rate: 20 mm/min. If measured under good conditions, the size of the crystallites can be determined to two significant digits with a good reproducibility.

Figure 3:
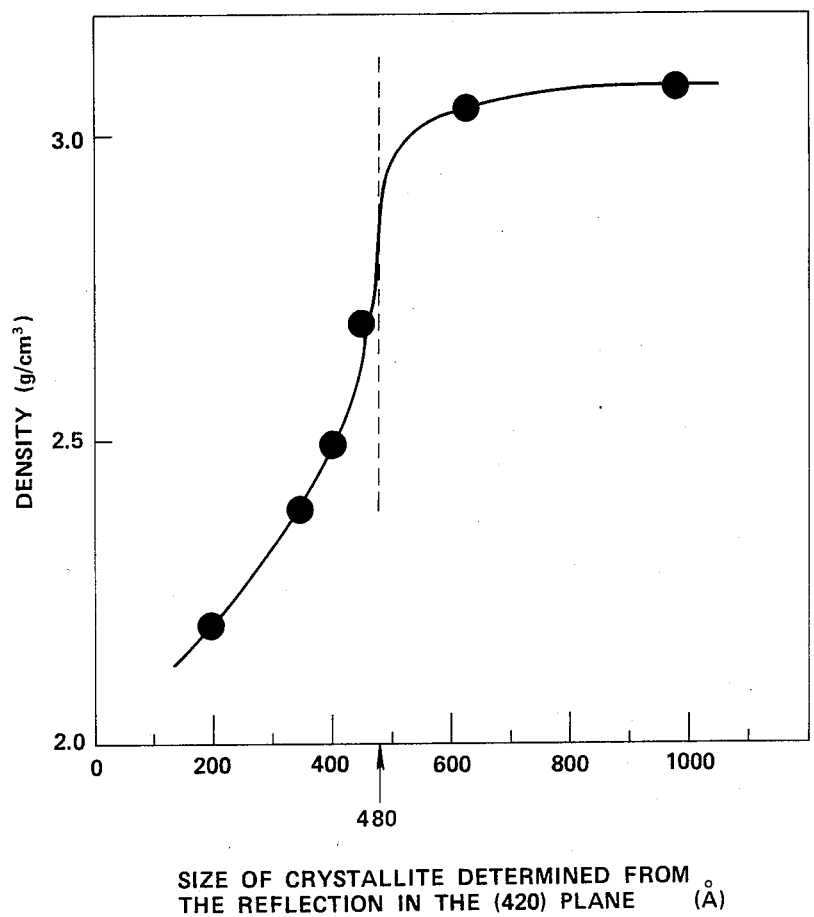
FIG. 3 shows a graph exhibiting the relation between the size of crystallites of the raw material β-SiC powder and the density of sintered samples obtained in examples 1 and 2 and comparative examples 1 and 2.

The inventors have investigated the relation between the size of the crystallites determined in this way and the degree of sintering. As a result, the following has been determined. All synthesized β-SiC powders hitherto generally are made up of crystallites of less than 480 Å in size determined from the reflection in the (4 2 0) plane measured by the powder X-ray diffraction method. However, as shown in FIG. 3 (where 1.5% by weight of carbon and 0.09% by weight of boron are added as sintering additives as will be described later in examples), a specimen having a high density can be produced in the presence of small amounts of sintering additives by using the β-SiC powder made up of crystallites of more than 480 Å in size. By using the β-SiC powder made up of crystallites of more than 600 Å in size, an excellent specimen having an especially high density can be obtained.

According to the process of the invention, by using the β-SiC powder made up of crystallites of more than 480 Å in size, preferably more than 600 Å, a sintered β-SiC which has the high density can be obtained with the addition of sintering additives in small amounts, such as example, the addition of from 0.5% by weight to 3% by weight of carbon and from 0.05% by weight to less than 0.3% by weight of boron, or with the addition of from 0.5% by weight to 3% by weight of carbon, from 0.05% by weight of 0.2% by weight of boron and from 0.05% by weight to 1% by weight of an aluminum-containing compound.

Needless to say, in the case where additives in large amounts are added, there exists a correlation between the size of crystallites and the degree of denseness of the specimen as shown in FIG. 3. However, this correlation is not so pronounced in the addition ranges of over 3% by weight of carbon and over 0.3% by weight of boron, or in the addition ranges of over 3% by weight of carbon, over 0.2% by weight of boron and over 1% by weight of an aluminium-containing compound. In the case where additives in extremely small amounts are added, namely, less than 0.5% by weight of carbon and less than 0.05% by weight of boron are added, it is difficult to obtain an excellent sintered β-SiC with a good reproducibility due to the influence of other sintering conditions.

There are no restrictions placed on the process for producing the β-SiC powder made up of crystallites of more than 480 Å in size used in the invention. As in examples described later, it can be easily produced by heat-treating β-SiC powder on the market at high temperatures in an atmosphere of inert gas.

Further, in the case of the silica reduction method, β-SiC powder having crystallites of more than 480 Å is obtained by synthesis at temperatures of 1600° to 2000° C., preferably 1800° to 2000° C. With the silica reduction method, this powder can be easily synthesized using a solid precursor obtained by solidifying a mixture of the following components (a) to (c) as a raw material:
Component (a): liquid silicide and organic compound having a functional group.
Component (b): Silicic solid.
Component (c): carbonaceous solid.
It is preferable to use the β-SiC powder obtained by the synthesizing method in the process of this invention.

The liquid silicide of the component (a) used in the synthesizing method includes:

(i) Compounds obtained by acid-decomposing or dealkalizing silicic acid alkali solutions; e.g., silicic acid polymers obtained by dealkalizing water glass.

(ii) A group of polymers obtained by trimethylsilylating hydrolytic silicides; e.g., polymers obtained by the reaction of ethyl silicate with trimethylsilyl chloride.

(iii) Esters of hydrolytic silicides and organic compounds or organometallic compounds; e.g., ortho ethyl silicate synthesized by the reaction of silicon tetrachloride with ethanol, and polymers thereof. The organic compounds include aliphatic and aromatic alcohols, glycol, diole, triole, etc.

The organic compound having a functional group of component (a) used in the synthesizing method is any one which can be highly polymerized by a polymerization reaction or the like. Preferable organic compounds having a functional group include monomers and oligomers which are highly polymerized to form thermosetting resins with a high carbon residue rate, such as phenol resin, furan resin, polyimide resin, polyamide resin, polyurethane, etc., or polymers thereof. Among them, phenol resin, especially resol-type phenol resin, is preferable.

The silicic solid of component (b) is any silicic solid which can react with carbon at high temperatures under a nonoxidizing atmosphere to form SiC. From an economical point of view, it is preferable to use a silicic solid essentially composed of silica such as silica powder, amorphous silica powder or the like.

A preferable carbonaceous solid of component (c) is one which is prepared by grinding and highly purifying carbon black, natural graphite, petroleum coke or the like. In the case where the mixture of (a) to (c) is granulated and then reacted at high temperatures, tar pitch, heat-reformed petroleum pitch or the like can be used. Furthermore, it is possible to use substances which generate free carbon at temperatures above 1000° C. under a nonoxidizing atmosphere.

To obtain the solid precursor by solidifying the components (a) to (c), the components (b) and (c) are mixed with component (a), preferably they are fully stirred, and then the resultant mixture is heated to solidify component (a). Component (a) may be solidified only by heating. However, for the promotion of the reaction, it is preferable to solidify component (a) using a catalyst appropriate for the liquid silicide and an organic compound having a functional group. Component (a) may be solidified, in the presence or absence of a catalyst, by the polymerization reaction of the liquid silicide with an organic compound having a functional group, or by the polymerization reaction or bridging reaction of either of the two. The catalyst is any catalyst which is usually used in the polymerization or bridging reaction. Examples of the catalyst include mineral acids such as hydrochloric acid, sulfuric acid, boric acid, etc; alkalis such as sodium ethylate, etc; organic peroxides; organic sulfonic acid and related substances; etc.

The homogeneous solid thus obtained by the polymerization or bridging reaction of the component (a) is heated to 1600°–2000° C. under a nonoxidizing atmosphere, for example, under vacuum or in nitrogen, helium or argon to obtain SiC. Prior to this treatment by heating, the homogeneous solid is preferably heat-treated at temperatures above 500° C. to remove fugacious ingredients mainly contained in the component (a). Needless to say, other pretreatments than the above-mentioned heat treatment can be performed. Also, it is possible to omit the pretreatment and subject the homogeneous solid directly to the heat treatment for synthesizing SiC.

The compounding ratio of the component (a) (liquid silicide and organic compound having a functional group), component (b) (silicic solid) and component (c) (carbonaceous solid) which are the raw material for the synthesis of SiC, is determined on the basis of the atomic ratio of C/Si in a product obtained by treating a solid precursor prepared from the mixture of the components (a) to (c) at temperatures of 800° to 1400° C. under a nonoxidizing atmosphere. It is proper to determine the compounding ratio of the components (a)–(c) such that the atomic ratio of C/Si in the product obtained by such a treatment is $1 < C/Si < 10$, preferably $C/Si \approx 3$. In the case where C (carbon) is allowed to remain in the product after the synthesis, the compounding ratio is determined such that the atomic ratio of C/Si in the product obtained by the treatment is $C/Si > 3$. However, it is necessary to avoid a compounding ratio in which components (b) and (c) are in a state before they are solidified in the presence of the component (a). In the above-mentioned treatment at temperatures of 800° to 1400° C. under a nonoxidizing atmosphere, for example, the compounding ratio with the amount of component (a) is extremely small, less than 5% by weight. The treatment at temperatures of 800° to 1400° C. under a nonoxidizing atmosphere is performed for the determination of the atomic ratio. It is not necessarily required for the synthesis of SiC.

In the present invention, a sintered cubic silicon carbide (sintered β-SiC) is produced by sintering the cubic silicon carbide powder (β-SiC powder) made up of crystallites of more than 480 Å in size determined from the reflection in the (4 2 0) plane measured by the powder X-ray diffraction method preferably with sintering additives such as carbon, boron and an aluminum-containing compound. Preferably, the β-SiC powder is sintered with a combination of carbon and boron or with a combination of carbon, boron and an aluminum-containing compound. In the former case, the amount of carbon may preferably be in the range of from 0.5% by weight to 3% by weight and the amount of boron may preferably be in the range of from 0.05% by weight to less than 0.3% by weight. In the latter case, the amount of carbon may preferably be in the range of from 0.5% by weight to 3% by weight, the amount of boron may preferably be in the range of from 0.5% by weight to 3% by weight and the amount of the aluminum-containing compound may preferably be in the range of from 0.05% by weight to 1% by weight.

The source of carbon used as a sintering additives includes fine-powdered carbon or organic substances which can be carbonized or can be decomposed to form carbon upon heating. Preferable organic substances which can be carbonized include polyphenylenephenol resin and the like which give carbon in high yields. The source of boron used as a sintering additive may be boron or boron-containing compounds. It is possible to use crystalline boron or noncrystal boron. The primary particle size should be as small as possible, preferably less than 10$\mu$. Examples of the boron-containing compound include BN, B$_4$C, etc. Examples of the aluminium-containing compound include inorganic substances such as alumina (Al$_2$O$_3$), aluminium nitride (AlN), etc.; and organic aluminium compounds such as aluminium isopropoxido (Al(OC$_3$H$_7$)), etc.

According to the process of the invention, by using the $\beta$-SiC powder made up of crystallites of more than 480 Å in size as a raw material for sintering, the sintered $\beta$-SiC can be produced with the addition of sintering additives in small amounts. Consequently, the exaggerated grain growth in sintering is depressed, whereby the sintered $\beta$-SiC having a high density can be obtained.

The present invention is further illustrated in the following examples and comparative examples. However, the invention is not limited to the examples. The invention may be embodied in other specific forms without departing from its spirit or essential characteristics.

EXAMPLE 1

$\beta$-SiC powder having the properties shown in Table 1 was heat-treated for 30 minutes at 2000° C. in an atmosphere of argon. The resultant powder was ground using a ball mill made of $\beta$-SiC. The properties of the $\beta$-SiC powder synthesized by this treatment are shown in Table 2.

TABLE 1

| $\beta$-SiC powder before heat treatment. | |
|---|---|
| True specific gravity (g/cm$^3$) | 3.19–3.22 |
| Size of crystallite determined from the reflection in the (420) plane (Å) | 350 |
| Average particle size ($\mu$m) | 0.25–0.28 |
| Impurities (%) | |
| Al | 0.03 |
| Fe | 0.03 |
| SiO$_2$ | 0.22 |
| C | 0.34 |

TABLE 2

| Ground $\beta$-SiC powder after heat treatment. | |
|---|---|
| True specific gravity (g/cm$^3$) | 3.19–3.22 |
| Size of crystallite (Å) determined by the same procedure as Table 1 | 650 |
| Average particle size ($\mu$m) | 0.25 |
| Impurities (%) | |
| Al | 0.01 |
| Fe | 0.01 |
| SiO$_2$ | 0.05 |
| C | 0.2 |

The $\beta$-SiC powder made up of crystallites of 650 Å in size obtained by the heat treatment was sintered using phenol resin as the source of carbon of sintering additives. First, the phenol resin was dissolved in a solution of methanol. The resultant solution was attached to the $\beta$-SiC powder so that 1.5% by weight of carbon would remain. After the addition of 0.09% by weight of boron, they were fully mixed and shaped with a rubber press. The shaped mixture was heated for 30 minutes at 1500° C. under the condition of 10$^{-3}$ Torr, and then burned for 15 minutes at 2200° C. in an atmosphere of argon gas under 1 atmospheric pressure. The sintered $\beta$-SiC thus obtained was made up of particles of about 4–10 $\mu$m. No exaggerated grain growth was observed. The sintered $\beta$-SiC had an extremely high density of 3.05 g/cm$^3$.

EXAMPLE 2

Poly-ethylsilicate containing 41% by weight of SiO$_2$ was used as a liquid silicide, and resol-type phenol resin (carbon residue rate: 40%) was used as a liquid organic compound having functional group. Poly-ethylsilicate has a chemical formula shown below;

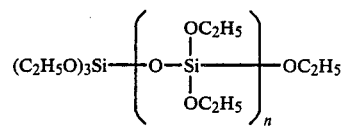

wherein n is 4 to 6.

The mixed solution of 62% by weight of polyethylsilicate and 38% by weight of the phenol resin was solidified in the presence of an acid catalyst to obtain a transparent resinous solid. The resinous solid was heated to 1000° C. at the temperature raising rate of 10° C./min under an atmosphere of nitrogen. The resultant solid was homogeneous and dense, and its contents of C and Si were thought to be C/Si=3 from the carbon residue rate. In the powder X-ray diffraction, there appeared only a diffracted ray having a width peculiar to a noncrystal carbon-based substance, and other diffracted rays were not detected. This revealed that the solid is a noncrystal solid containing Si, O and C. Next, the solid was heated to 1800° C. at the temperature raising rate of 30° C./min under an atmosphere of argon, and maintained at the temperature for 30 minutes to obtain $\beta$-SiC powder. The $\beta$-SiC powder thus obtained had the properties as shown in Table 3.

TABLE 3

| Properties of $\beta$-SiC powder produced using the organic compound precursor. | |
|---|---|
| True specific gravity (g/cm$^3$) | 3.19–3.22 |
| Size of crystallite (Å) determined by the same procedure as Table 1 | 950 |
| Average particle size ($\mu$m) | 0.5 |
| Impurities (%) | |
| Al | 0.01 |
| Fe | 0.01 |
| SiO$_2$ | 0.03 |
| C | 0.5 |

The $\beta$-SiC powder was sintered in the same manner as in Example 1 to obtain a sintered $\beta$-SiC having the density of 3.08 g/cm$^3$.

EXAMPLE 3

62% by weight of poly-ethylsilicate containing 41% by weight of SiO$_2$ as a liquid silicide and 38% by weight of resol-type phenol resin (carbon residue rate: 40%) as an organic compound having a functional group were homogeneously mixed to prepare the component (a) previously described. To the component (a) thus prepared was added a powdered mixture of amorphous silica powder of high purity (component (b)) and carbon black (component (c)) in a weight ratio of 5:3 to obtain a dispersed solution.

To the dispersed solution thus obtained was added about 15% by weight of acid catalyst, and then it was vigorously stirred. At about 15 minutes after standing, the solution was solidified. The resultant solid was heated to 1000° C. at the temperature raising rate of 10° C./min under a nonoxidizing atmosphere. At this stage, the solid (hereafter referred to as sample No. 1) was slightly cracked. However, when a fraction of the solid was collected and slightly ground, it was not ground to the particle size level of the amorphous silica powder used as a raw material.

Half the amount of the sample No. 1 obtained was collected and heated to 1600° C. at the temperature raising rate of 10° C./min under a nonoxidizing atmosphere to prepare sample No. 2. Observation of the sample No. 2 revealed that there was an increase in number of cracks and a part of the sample was fragmented, but it was not ground to the particle size level of the amorphous silica powder used as a raw material.

Examination of sample No. 2 by the powder X-ray diffraction method showed that a part of the sample was converted into SiC. However, as a result of the analysis by infrared absorption spectra, unreacted SiO$_2$ was found to remain in large amounts. The remainder of sample No. 1 was heat-treated for 15 minutes at 1900° C. to obtain sample No. 3, and examined by the powder X-ray diffraction method. As a result, it turned out that β-SiC fine powder was obtained. Also, the observation by infrared absorption spectra revealed that almost no unreacted SiO$_2$ was present. The properties of the β-SiC fine powder (the sample No. 3) obtained are as shown in Table 4.

TABLE 4

Properties of β-SiC produced using a precursor synthesized from the organic compound, silica fine powder and carbon black.

| | |
|---|---|
| True specific gravity (g/cm$^3$) | 3.19–3.22 |
| Size of crystallite (Å) determined by the same procedure as Table 1 | 660 |
| Average particle size (μm) | 0.6 |
| Impurities (%) | |
| Al | 0.03 |
| Fe | 0.03 |
| SiO$_2$ | 0.08 |
| C | 0.5 |

The β-SiC powder was sintered in the same manner as in Example 1 to obtain sintered β-SiC having the density of 3.05 g/cm$^3$.

COMPARATIVE EXAMPLE 1

β-SiC powder having the properties shown in Table 1 was sintered by the same procedure as in Example 1 without heat treatment. The resultant sintered β-SiC was not as dense; its density was 2.40 g/cm$^3$.

COMPARATIVE EXAMPLE 2

β-SiC powders made up of crystallites of 200 Å, 400 Å and 450 Å in size determined from the reflection in the (4 2 0) plane were sintered by the same procedure as in Comparative example 1, respectively. The densities of the resultant sintered silicon carbides were measured.

The results of the measurement are shown in FIG. 3, together with the results obtained in Examples 1–3 and Comparative Example 1.

As is apparent from FIG. 3, there exists a very definite correlation between the size of crystallites of β-SiC powders and the degree of sintering. It is apparent that the sintered β-SiC having an especially high density can be obtained by sintering the β-SiC powder made up of crystallites of more than 480 Å in size according to the process of the invention.

As has been described in detail, according to the invention, the β-SiC powder made up of crystallites of more than 480 Å in size is used as a starting powder in producing a sintered β-SiC, whereby good sintering can be performed in the presence of sintering additives in small amounts. Therefore, according to the process of the invention, the exaggerated grain growth is prevented, whereby sintered β-SiC having an especially high density can be easily produced.

What is claimed is:

1. A process for producing a high density normal sintered cubic silicon carbide which comprises:
sintering cubic silicon carbide powder made up of crystallites of more than 480 Å in size determined from the reflection in the (4 2 0) plane measured by the powder X-ray diffraction method, said silicon carbide powder being produced by heating and burning a raw material at a temperature of 1600° C. to 2000° C. under a nonoxidizing atmosphere, said raw material being a solid precursor obtained by solidifying a mixture of the following components (a)–(c)
   (a) liquid silicide and an organic compound having a functional group,
   (b) silicic solid, and
   (c) carbonaceous solid
by a polymerization reaction of the liquid silicide with the organic compound having a functional group or by a polymerization reaction or bridging reaction of either the liquid silicide or the silicic acid with sintering additives including carbon of from 0.5% to 3% by weight and boron of from 0.05% to less than 0.3% by weight or carbon of from 0.5% to 3% by weight, boron of 0.05% to 0.2% by weight and an aluminum-containing compound of from 0.05% to 1% by weight, said sintering being conducted under conditions which depress exaggerated grain growth.

2. A process according to claim 1, wherein the cubic silicon carbide powder is made up of crystallites of more than 600 Å.

3. A process according to claim 1, wherein carbon of from 0.5% to 3% by weight and boron of from 0.05% to less than 0.3% by weight are used as sintering additives to said cubic silicon carbide powder in the sintering.

4. A process according to claim 1, wherein carbon of from 0.5% to 3% by weight, boron of from 0.05% to 0.2% by weight, and an aluminium-containing compound of from 0.05% to 1% by weight are used as sintering additives to said cubic silicon carbide powder in the sintering.

5. A process according to claim 1, wherein said liquid silicide in the component (a) is obtained by the thermal decomposition or dealkalizing reaction of a silicic acid alkali solution.

6. A process according to claim 1, wherein said liquid silicide in the component (a) is an ester of an organic compound having a hydroxyl group and silicic acid.

7. A process according to claim 1, wherein said liquid silicide in the component (a) is an ester obtained by the reaction of a hydrolytic silicide with an organic compound or organometallic compound.

8. A process according to claim 7, wherein said liquid silicide in the component (a) is ortho-ethylsilicate or poly-ethylsilicate.

9. A process according to claim 1, wherein said organic compound having a functional group in the component (a) is a phenol resin.

10. A process according to claim 1, wherein said mixture of the components (a)-(c) is solidified by the polymerization reaction of the liquid silicide with the organic compound having a functional group, or by the polymerization reaction or bridging reaction of either of the two, with application of heat.

11. A process according to claim 1, wherein said mixture of the components (a)-(c) is solidified by the polymerization reaction of the liquid silicide with the organic compound having a functional group, or by the polymerization reaction or bridging reaction of either of the two, in the presence of a catalyst.

12. The process according to claim 1, wherein the raw material is heated and burned at a temperature of 1800° C. to 2000° C.

13. A process for producing a high density normal sintered cubic silicon carbide which comprises:
preparing a raw material which is a solid precursor obtained by solidifying a mixture of the following components (a)-(c)
(a) liquid silicide and an organic compound having a functional group,
(b) silicic solid, and
(c) carbonaceous solid
by a polymerization reaction of the liquid silicide with the organic compound having a functional group or by a polymerization reaction or bridging reaction of either of the liquid silicide or the silicic acid; and
heating and burning said raw material at a temperature of 1600° C. to 2000° C. under a nonoxidizing atmosphere to produce a silicon carbide powder made up of crystallites of more than 480 Å in size determined from the reflection in the (4 2 0) plane measured by the powder X-ray defraction method to produce a cubic silicon carbide powder; and
sintering said cubic silicon carbide powder with sintering additives including carbon of from 0.05% to 3% by weight and boron of 0.05% to less than 0.3% by weight or carbon of from 0.5% to 3% by weight, boron of 0.05% to 0.2% by weight and an aluminum-containing compound of from 0.05% to 1% by weight to produce said high density normal sintered cubic silicon carbide while at the same time depressing exaggerated grain growth.

14. A process for producing a silicon carbide powder having crystallites of more than 480 Å in size determined from the reflection in the (4 2 0) plane measured by the powder X-ray diffraction method, comprising:
heating and burning a raw material containing silicic and carbonaceous substances at a temperature of 1600° C. to 2000° C. under a nonoxidizing atmosphere to produce said silicon carbide powder, said raw material being a solid precursor obtained by solidifying a mixture of the following components (a)-(c);
component (a): liquid silicide and organic compound having a functional group,
component (b): silicic solid, and
component (c): carbonaceous solid
by a polymerization reaction of the liquid silicide with the organic compound having a functional group, or by the polymerization reaction or bridging reaction of either of the liquid silicide or the organic compound.

15. A process according to claim 14, wherein the cubic silicon carbide powder is made up of crystallites of more than 600 Å.

16. A process according to claim 14, wherein said liquid silicide in the component (a) is obtained by the thermal decomposition or dealkalizing reaction of a silicic acid alkali solution.

17. A process according to claim 14, wherein said liquid silicide in the component (a) is an ester of an organic compound having hydroxyl group and silicic acid.

18. A process according to claim 14, wherein said liquid silicide in the component (a) is an ester obtained by the reaction of a hydrolytic silicide with an organic compound or organometallic compound.

19. A process according to claim 18, wherein said liquid silicide in the component (a) is ortho-ethylsilicate or poly-ethylsilicate.

20. A process according to claim 19, wherein said organic compound having functional group in the component (a) is a phenol resin.

21. A process according to claim 14, wherein said mixture of the components (a)-(c) is solidified by the polymerization reaction of the liquid silicide with the organic compound having functional group, or by the polymerization reaction or bridging reaction of either of the two, with application of heat.

22. A process according to claim 14, wherein said mixture of the components (a)-(c) is solidified by the polymerization reaction of the liquid silicide with the organic compound having functional group, or by the polymerization reaction or bridging reaction of either of the two, in the presence of a catalyst.

* * * * *